US009323656B2

(12) United States Patent
Ambasta et al.

(10) Patent No.: US 9,323,656 B2
(45) Date of Patent: *Apr. 26, 2016

(54) COMPUTER PROGRAM INSTALLATION ACROSS MULTIPLE MEMORIES

(71) Applicant: International Business Machines Corporation, Armonk, NY (US)

(72) Inventors: Rohan A. Ambasta, Pune (IN); Bharath Ganesh, Karamana (IN); Aniket A. Kulkarni, Pune (IN); Umesh S. Wani, Pune (IN)

(73) Assignee: International Business Machines Corporation, Armonk, NY (US)

( * ) Notice: Subject to any disclaimer, the term of this patent is extended or adjusted under 35 U.S.C. 154(b) by 43 days.

This patent is subject to a terminal disclaimer.

(21) Appl. No.: 13/926,405

(22) Filed: Jun. 25, 2013

(65) Prior Publication Data

US 2014/0380302 A1     Dec. 25, 2014

(51) Int. Cl.
*G06F 9/445* (2006.01)
*G06F 12/02* (2006.01)

(52) U.S. Cl.
CPC ............... *G06F 12/023* (2013.01); *G06F 8/61* (2013.01); *G06F 2212/1044* (2013.01)

(58) Field of Classification Search
None
See application file for complete search history.

(56) References Cited

U.S. PATENT DOCUMENTS

| 5,604,906 | A | 2/1997 | Murphy et al. |
| 6,138,179 | A | 10/2000 | Chrabaszcz et al. |
| 6,279,154 | B1 | 8/2001 | Davis |
| 6,453,413 | B1 | 9/2002 | Chen et al. |
| 6,601,236 | B1 | 7/2003 | Curtis |
| 6,633,867 | B1 | 10/2003 | Kraft et al. |
| 6,718,373 | B1 | 4/2004 | Bearden et al. |
| 2003/0018870 | A1 | 1/2003 | Abboud et al. |
| 2009/0307477 | A1 | 12/2009 | Matthew et al. |

(Continued)

FOREIGN PATENT DOCUMENTS

EP     1768021 A1     3/2007

OTHER PUBLICATIONS

Wikipedia, "Disk Partitioning", http://en.wikipedia.org/wiki/Disk_partitioning, Archive.org, Jan. 31, 2013.*

(Continued)

*Primary Examiner* — Wei Zhen
*Assistant Examiner* — Timothy Duncan
(74) *Attorney, Agent, or Firm* — Richard A. Wilhelm; Steve Kurlowecz

(57) ABSTRACT

Embodiments herein are directed to a method for installing a program across multiple memories. The method includes calculating a memory space requirement of the program. It may be determined that a first available memory space in a first memory of the first computer system is smaller than the memory space requirement. The first memory is a default memory for installing the program. Upon determining that the first available memory space in the first memory is smaller than the memory space requirement, the method may perform the step of identifying a second memory in communication with the first computer system that has a second available memory space. The first and second available memory spaces, when combined, are sufficient for the memory space requirement to install files of the program. The files of the program may be installed in the first and second memories.

5 Claims, 5 Drawing Sheets

(56) References Cited

U.S. PATENT DOCUMENTS

| | | | | |
|---|---|---|---|---|
| 2011/0271273 | A1* | 11/2011 | Dumais | H04L 67/42 717/175 |
| 2012/0023491 | A1 | 1/2012 | Gattegno | |

OTHER PUBLICATIONS

Askville, How does an external hard drive work, http://askville.amazon.com/external-hard-drive-work-recommend/AnswerViewer.do?requestId=735454, accessed on Sep. 21, 2015.*

"Five Steps to Installing the Software", Automation Direct, ©1999-2013 AutomationDirect.com www.automationdirect.com/static/manuals/qsdsoftsec2.pdf.

"Installation (Computer Programs)", Wikipedia The Free Encyclopedia, Last modified Jun. 16, 2013. http://en.wikipedia.org/wiki/Installation_%28computer_programs%29.

"Installing Programs Onto Other Computer Drives", Electric Quilt Product Support, Last Modified Mar. 22, 2012 by Shriver, © The Electric Quilt Company. http://support.electricquilt.com/Installing-programs-onto-other-computer-drives-ashx.

Ambasta et al., "Computer Program Installation Across Multiple Memories," U.S. Appl. No. 14/484,692, filed Sep. 12, 2014.

* cited by examiner

US 9,323,656 B2

COMPUTER PROGRAM INSTALLATION ACROSS MULTIPLE MEMORIES

FIELD

The present invention generally relates to data processing systems, and more specifically, managing computer program installation across multiple memory resources.

BACKGROUND

Installation of a computer program (including device drivers and plug-ins), is the act of making the program ready for execution. Because the process varies for each application and each computer, programs (including operating systems) often come with an installer, a specialized program responsible for doing whatever is needed for the program installation. An installation program or installer is a computer program that installs files, such as applications, drivers, or other software, onto a computer. Some installers are specifically made to install the files they contain; other installers are general-purpose and work by reading the contents of the computer program to be installed.

Some computer programs can be executed by simply copying them into a folder stored on a computer and executing them. Other programs are supplied in a form unsuitable for immediate execution and therefore need an installation procedure. Once installed, the program may be executed again and again, without the need to reinstall before each execution.

SUMMARY

Embodiments herein are directed to a method for installing a program across multiple memories. Also, embodiments are directed to a computer readable memory medium and a computer system performing the same. The method includes calculating a memory space requirement of the program. It may be determined that a first available memory space in a first memory of the first computer system is smaller than the memory space requirement. The first memory is a default memory for installing the program. Upon determining that the first available memory space in the first memory is smaller than the memory space requirement, the method may perform the step of identifying a second memory in communication with the first computer system that has a second available memory space. A sum of the first available memory space and the second available memory space is computed. It is determined whether the sum is greater than or equal to the memory space requirement to install files of the program. The files of the program may be installed in the first and second memories.

BRIEF DESCRIPTION OF THE DRAWINGS

In the drawings and the Detailed Description, like numbers generally refer to like components, parts, steps, operations, and processes.

DETAILED DESCRIPTION

Figure 1:
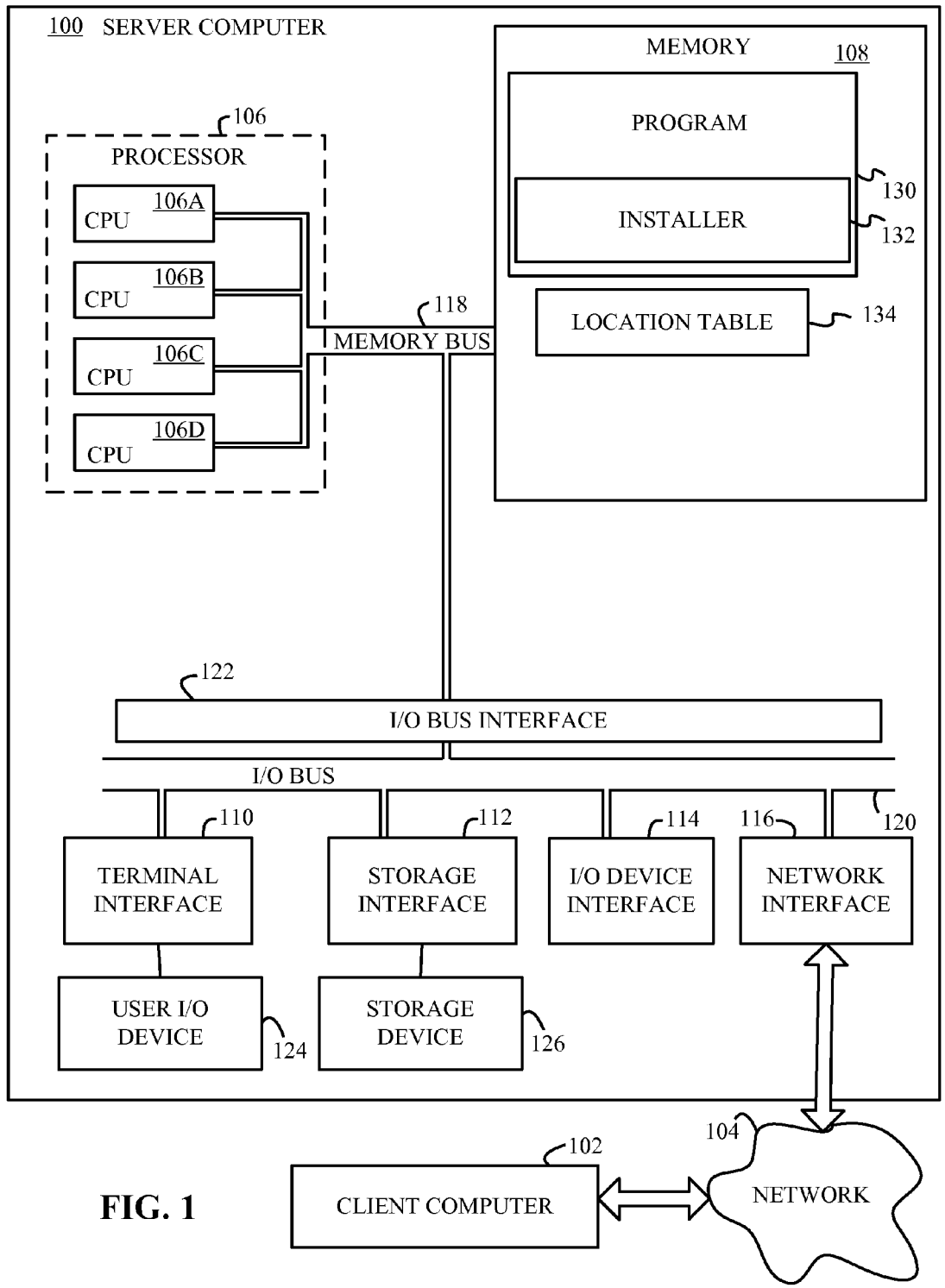
FIG. 1 depicts a high-level block diagram of an exemplary computer system for implementing an embodiment.

A common operation performed during most computer program installations is determining whether there is sufficient space on a memory for a memory space requirement of the computer program. If there is sufficient space, the installation process proceeds. If there is not sufficient space, then the installation process is declined or the program is installed on an alternate memory that has sufficient memory space available.

In some situations, there may not be sufficient memory space on any one of the available memories of the computer system. However, there may be sufficient combined space between all memories to fulfill the memory space requirement of the program. For example, a C drive may have 100 MB available memory space, a D drive may have 300 MB of available memory space, and an E drive may have 200 MB of available memory space. If the computer program requires 550 MB of available memory space, no single drive has 550 MB to install it. However, the combined available memory space of the computer system is 600 MB when adding the available memory space of all three drives. Current installers may require the memory space to be in a single location. So regardless of whether the computer system has a combined available memory space greater than the memory space requirement of the program, the installer will not install the program since the memory space requirement is not available on a single memory. In some instances, there may not even be sufficient combined available memory space on the memories of the computer system to install the program. In other instances, the user may want to use unused memory space on specific memories.

Embodiments herein describe a computer system and method that may install a program across multiple memories on the same computer system and selectively attachable portable memory. An installer may set up a location table for a plurality of program files. The location table may map the locations of program files across multiple memories. The installer may install the files on a selectively attachable portable memory if the combined memory space of the memories of the computer system is not sufficient of the memory space requirement of the program.

An advantage of the embodiments herein includes not having to add additional memories, which have sufficient available memory space for the program, to a computer system when not one of the present memories has sufficient available memory space but the present combined available memory space across all memories has sufficient available memory space. Another advantage is that existing memories may not need to be replaced with memories having higher memory space. In some situations, it is not practical to do this. For example, in a situation where a server is the computer system, adding new memories or higher memory space memories may require the server to be powered off and restarted. However, this may be difficult to do because of the number of programs running on the server. Also, it may be difficult to cleaning up memory space on a memory or consolidate files due to the sensitivity of some files.

Referring to the drawings FIG. 1 depicts a high-level block diagram representation of a server computer system 100 connected to a client computer system 102 via a network 104, according to an embodiment. The terms "server" and "client" are used herein for convenience only, and in various embodiments a computer system that operates as a client computer in one environment may operate as a server computer in another environment, and vice versa. The mechanisms and apparatus of embodiments apply equally to any appropriate computing system, including a computer system that does not employ the client-server model.

The major components of the computer system 100 may include one or more processors 106, a main memory 108, a terminal interface 110, a memory interface 112, an I/O (Input/Output) device interface 114, and a network interface 116, all of which may be communicatively coupled, directly or indirectly, for inter-component communication via a memory bus 118, an I/O bus 120, and an I/O bus interface unit 122.

The computer system 100 may contain one or more general-purpose programmable central processing units (CPUs) 106A, 106B, 106C, and 106D, herein generically referred to as the processor 106. In an embodiment, the computer system 100 may contain multiple processors typical of a relatively large system; however, in another embodiment the computer system 100 may alternatively be a single CPU system. Each processor 106 may execute instructions stored in the main memory 108 and may include one or more levels of on-board cache.

In an embodiment, the main memory 108 may include a random-access semiconductor memory, memory, or memory medium (either volatile or non-volatile) for storing or encoding data and programs. In another embodiment, the main memory 108 may represent the entire virtual memory of the computer system 100, and may also include the virtual memory of other computer systems coupled to the computer system 100 or connected via the network 104. The main memory 108 may be conceptually a single monolithic entity, but in other embodiments the main memory 108 may be a more complex arrangement, such as a hierarchy of caches and other memory devices.

The main memory 108 may store or encode a program 130, a program installer 132, and a location table 134. Although the program 130, the program installer 132, and the location table 134 are illustrated as being contained within the memory 108 in the computer system 100, in other embodiments some or all of them may be on different computer systems and may be accessed remotely, e.g., via the network 104. The computer system 100 may use virtual addressing mechanisms that allow the programs of the computer system 100 to behave as if they only have access to a large, single memory entity instead of access to multiple, smaller memory entities. Thus, while the program 130, the program installer 132, and the location table 134 are illustrated as being contained within the main memory 108, these elements are not necessarily completely contained in the same memory (also referred to as memory herein) at the same time. Further, the program 130, the program installer 132, and the location table 134 are illustrated as being separate entities, in other embodiments some of them, portions of some of them, or all of them may be packaged together.

In an embodiment, the program 130, the program installer 132, and the location table 134 may include instructions or statements that execute on the processor 106 or instructions or statements that may be interpreted by instructions or statements that execute on the processor 106, to carry out the functions as further described below with reference to FIGS. 2, 3, 4, and 5. In another embodiment, the program 130, the program installer 132, and the location table 134 or two or more of these elements may be implemented in hardware via semiconductor devices, chips, logical gates, circuits, circuit cards, other physical hardware devices, or a combination of these devices in lieu of, or in addition to, a processor-based system. In an embodiment the program 130, the program installer 132, and the location table 134, or two or more of these elements may include data in addition to instructions or statements.

The memory bus 118 may provide a data communication path for transferring data among the processor 106, the main memory 108, and the I/O bus interface 122. The I/O bus interface 122 may be further coupled to the I/O bus 120 for transferring data to and from the various I/O units. The I/O bus interface unit 122 communicates with multiple I/O interface units 110, 112, 114, and 116, which may also be known as I/O processors (IOPs) or I/O adapters (IOAs), through the I/O bus 120.

The I/O interface units support communication with a variety of memory and I/O devices. For example, the terminal interface unit 110 supports the attachment of one or more user I/O devices 124, which may include user output devices (such as a video display device, speaker, or television set) and user input devices (such as a keyboard, mouse, keypad, touchpad, trackball, buttons, light pen, or other pointing device). A user may manipulate the user input devices utilizing a user interface, in order to provide input data and commands to the user I/O device 124 and the computer system 100, and may receive output data via the user output devices. For example, a user interface may be presented via the user I/O device 124, such as displayed on a display device, played via a speaker, or printed via a printer.

The memory interface 112 supports the attachment of one or more disk drives or direct access memories 126, also referred to as memories herein, (which are typically rotating magnetic disk drive memories, although they could alternatively be other memories, including arrays of disk drives configured to appear as a single large memory to a host computer). In another embodiment, the memory 126 may be implemented via any type of secondary memory. In an embodiment, the memory 126 may be a flash drive, pen drive, selectively attachable portable hard drive, or any other selectively attachable portable memory. The contents of the main memory 108, or any portion thereof, may be stored to and retrieved from the memory 126 as needed. The I/O device interface 114 may provide an interface to any of various other input/output devices or devices of other types, such as printers or fax machines. The network interface 116 may provide one or more communications paths from the computer system 100 to other digital devices and client computer systems 102; such paths may include, e.g., one or more networks 104.

Figure 2:
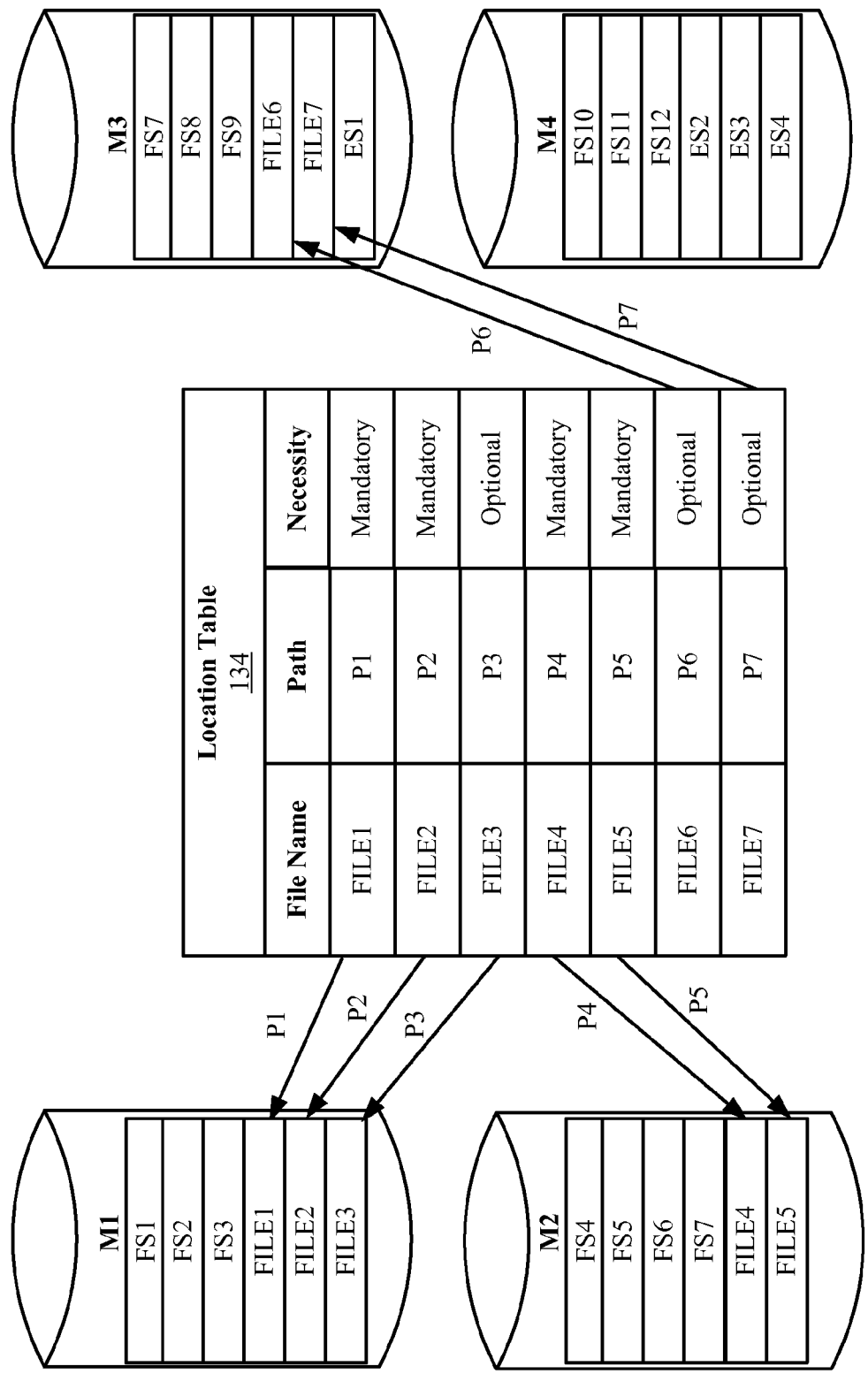
FIG. 2 depicts a block diagram of a location table of program files across multiple memories, according to an embodiment.

FIG. 2 is a block diagram of a location table of program files stored across multiple memories, according to an embodiment. The location table 134 may be a data table that contains the paths of the files of the program being installed across multiple memories. FIG. 2 illustrates four memories: a first memory M1, a second memory M2, a third memory M3, and a fourth memory M4, however more or less memories may be included. The location table 134 may be stored in one of the memories and may be called into main memory 108 when the program 130 is being executed, in an embodiment.

The location table 134 may include the file name. The location table 134 of FIG. 2 lists seven files of the program 130 (FILE1-FILE7), for illustration purposes. The location table 134 may also list the path of locations of the files stored on the various memories. FIG. 2 illustrates paths P1-P7 for each file (FILE1-FILE7), respectively. The paths P1-P7 may describe the file location by the memory where the file is stored and the folder or folders where it is located within the memory. In an embodiment, more than one file may be in the same folder so they may share the same path.

The location table 134 may include other information about the file that may be useful when creating rules on how to store the specific files. For example, the location table 134 may indicate the necessity of the file in whether it is a mandatory file or an optional file. A file may be mandatory when it is required for executing the program 130 and optional when it is not necessary for executing the program 130 but may be called during the execution. There may be a rule that the installer 132 may install all mandatory files on the same memory and all optional files on a different memory. Other examples of information about the files on the location table may include, but are not limited to, size, type, and security level.

The memories M1-M4 may be occupied with data prior to the installation of the program 130. The memories M1-M4 may be any type of computer readable memory medium. The memories M1-M4 may be an internal memory of a computer system or the memories may selectively attachable portable memories, or a combination of the two. The memories may be distinct partitions of a single memory. Slots labeled FS represent filled memory spaces (FS1-FS12) in the memories M1-M4. After installation of the program 130, some memory spaces of the memories M1-M4 may store the files (FILE1-FILE7) of the program 130. Remaining empty memory spaces of the memories M1-M4 may be referred to as ES (ES1-ES4).

In the example illustrated in FIG. 2, the program 130 may have seven files that need to be installed on a computer system 100 to execute the program 130. Once the installation process is initialized, the installer 132 may check the available memories M1-M4 for their available memory space. The first memory M1 may be a default memory such as a C drive on a personal computer where the installer 132 will look first to see if there is sufficient memory space for the program to be installed. The installer 132 may calculate the amount of first available memory space on M1 before other memories to determine whether the program 130 may be installed on it. Since there are only three first available memory spaces on M1, the seven files FILE1-FILE7 requiring seven memory units will not fit alone on M1. The installer 132 may then check the available memory space on all the remaining memories M2-M4 to determine if any one of them has seven available memory spaces. Since none of them do, the installer 132 may calculate the first available memory space from M1, a second available memory space from M2, and so on until it finds sufficient memory space to store all seven files FILE1-FILE7. Since M1 has three available memory spaces, M2 has two available spaces, and M3 has three available spaces, the installer 132 may determine that the program needs to be installed across these three memories since there are eight combined available memory spaces across these memories. The installer 132 may then begin installation by installing FILE1-FILE7 in the available memory spaces of M1-M3.

The example shows the files being installed sequentially in the next available memory space beginning with M1. However, the installer 132 may be governed by rules that may specify storage of certain files in a certain memory. In another embodiment, the installer 132 may be instructed not to completely fill a memory. In yet another embodiment, a user of the system may select the memories on which the program is going to be stored after the installer 132 prompts the user to do so.

Once the installer 132 has installed FILE1-FILE7, then the installer 132 may further create the location table 134 to map where the program 130 files are located so they may be recalled when the program 130 is executed. When executing the program 130 the location table 134 may be loaded into main memory 108. The program 130 may send a request for a file to the location table 134. The program 130 may retrieve the path of the file from the location table 134, and use the retrieved path in the request for the file.

Figure 3:
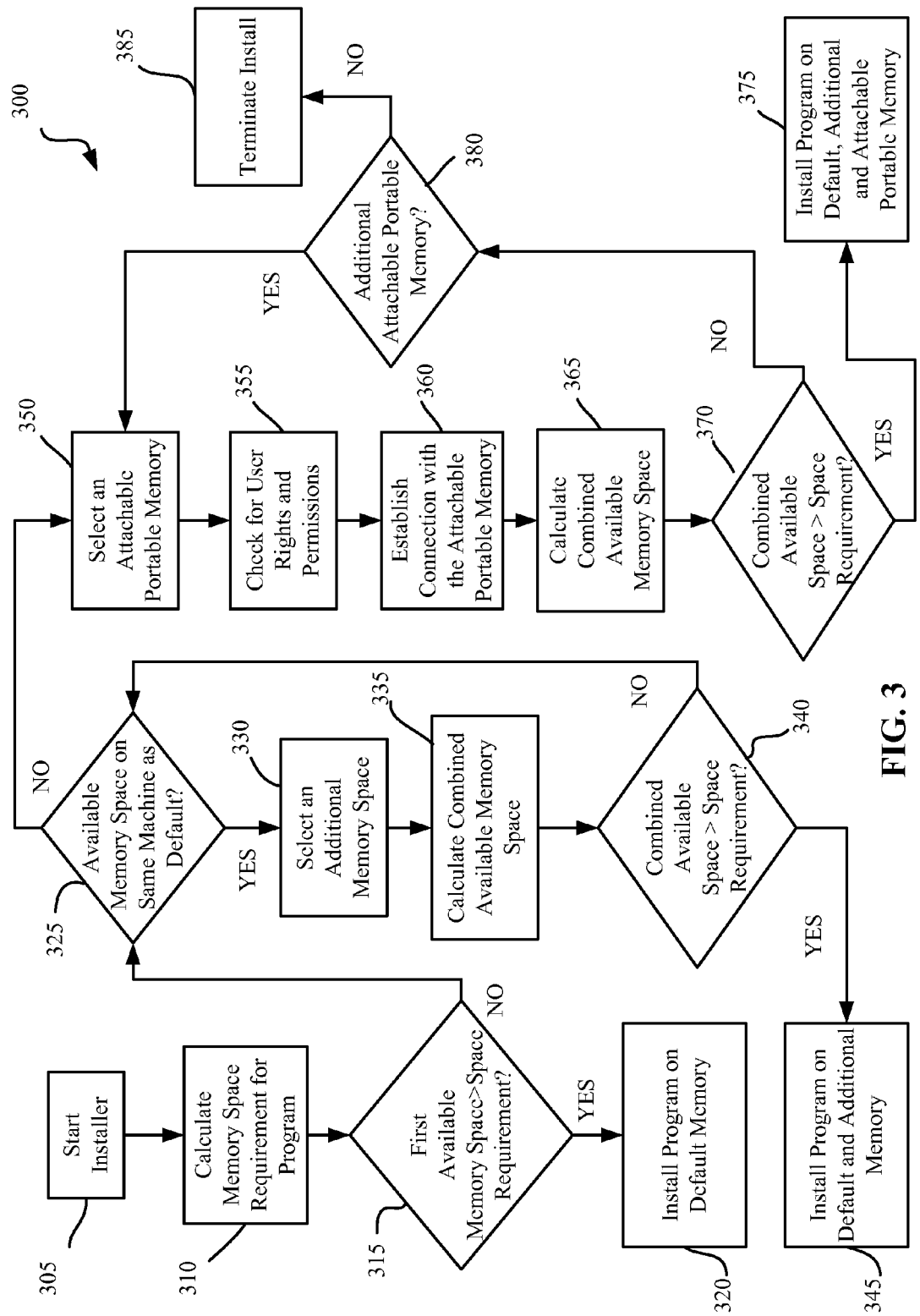
FIG. 3 depicts a flow chart of an exemplary method of determining which of one or more memories to store the computer program files, according to an embodiment.

FIG. 3 illustrates a flow chart of a method 300 of determining which of a plurality of memories to store the files of a computer program 130, according to an embodiment. In operation 305, the method 300 may begin when the program installation is initiated. The installer 132 may be started at this time. In operation 310, the installer 132 may calculate the memory space requirement for the program 130. In operation 315, the installer 132 may compare the first available memory space of the default memory, also known as the first memory, to the memory space requirement of the program 130. If the memory space requirement is less than the first available memory space, then, in operation 320 the program 130 may be installed on the default memory.

If the memory space requirement of the program 130 is greater than the first available memory space on the default memory, then, in operation 325, it may be determined whether there is a second available memory space on a second memory of the first computer system 100 as the default memory. If there is available memory space on the second memory on the first computer system as the default memory, then, in operation 330, the installer 132 may select the second memory.

In operation 335, the installer 132 may calculate the combined available memory space. The combined available memory space may be the first available memory space on the default memory and second available memory space of the second memory. In operation 340, the installer 132 may compare the combined available memory space to the memory space requirement for installing the program 130. If the combined available memory space is greater than the memory space requirement, then, in operation 345, the installer 132 may install the program 130 on the default memory and the second memory. If the combined available memory space is less than the memory space requirement, then the method 300 may return to operation 325 to determine whether there is any available memory space on a third memory on the first computer system. In another embodiment, after it is determined that there is not sufficient available memory space on the default memory, the installer 132 may determine whether any memory on the first computer system, a second computer system or on any selectively attachable portable memory may exclusively have available memory space that meets the memory space requirement of the program 130.

In operation 325, if the memories on the first computer system combined do not have sufficient combined available memory space, then the method may continue with operation 350. In operation 350, the installer 132 may select a selectively attachable portable memory (also referred to as a fourth memory but may also be the second or third memory if there is no other memory besides the default memory on the computer system) to the first computer system. The available memory space of the selectively attachable portable memory may be included in the combined available memory space. In operation 355, the installer 132 may check the selectively attachable portable memory for user rights and permissions. After checking and making sure the program 130 can have access, in operation 360 the installer 132 may establish a connection with the selectively attachable portable memory. In operation 365, the installer 132 may calculate the combined available memory space, which may be the first available memory space from the default memory, the second memory from the first computer system as the default memory, and the selectively attachable portable memory. In operation 370, if the combined available memory space is greater than the memory space requirement of the program 130, then, in operation 375, the program 130 may be installed across the default memory, the second memory, and the selectively attachable portable memory. If, in operation 370, the combined available memory space is less than the memory space requirement of the program 130, then the installer 132 may check whether there are anymore selectively attachable portable memories available in operation 380. If there are more selectively attachable portable memories, then the method 300 may return to operation 350. If there are no more selectively attachable portable memories, then, in operation 385, the installer 132 may terminate the installation of the program 130 or prompt the user to add more internal memories or another selectively attachable portable memory to the computer system 100. In some embodiments, the selectively attachable portable memory may be a thumb drive or an external hard drive, for example.

Figure 4:
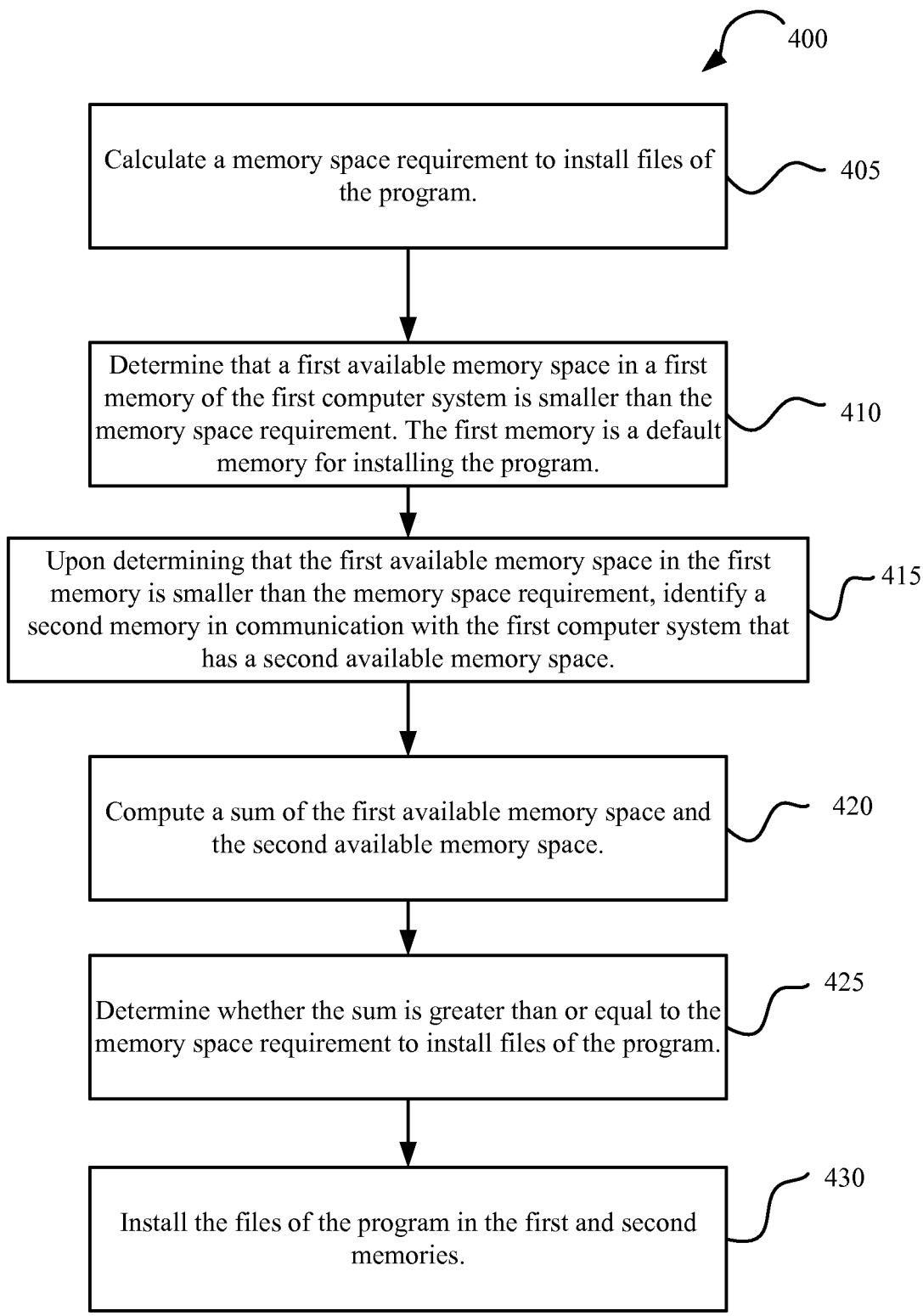
FIG. 4 depicts a flow chart of an exemplary method of installing a computer program across multiple memories, according to an embodiment.

FIG. 4 illustrates a method 400 of installing the program 130 across the multiple memories, according to an embodiment. In operation 405, the installer 132 may calculate a memory space requirement for the files of the program to be installed. In operation 410, it may be determined that the first available memory space in the first memory of the first computer system is smaller than the memory space requirement. The first memory may be the default memory for installing the program. In operation 415, upon determining that the first available memory space in the first memory may be smaller than the memory space requirement, the installer 132 may identify a second memory in communication with the first computer system that has the second available memory space. In operation 420, a sum of the first available memory space and the second available memory space may be computed. In operation 425, it may be determined whether the sum is greater than or equal to the memory space requirement to install files of the program. In operation 430, the installer 132 may install the files of the program in the first and second memories.

Figure 5:
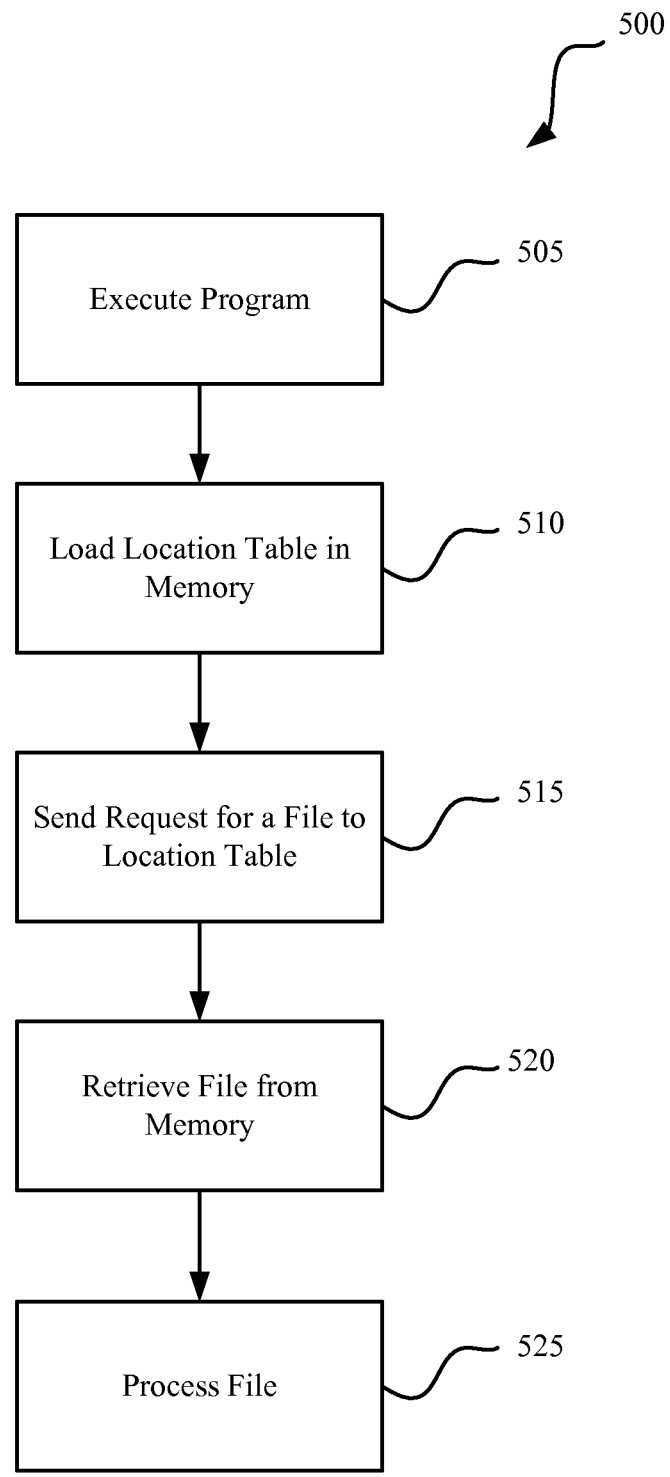
FIG. 5 depicts a flow chart of an exemplary method of executing a computer program stored across multiple memories, according to an embodiment.

FIG. 5 illustrates a method 500 of running a program 130, in which the files of the program 130 are installed at various memories. In operation 505, the program 130 may be started by the user or other program. In operation 510, the location table 134 may be loaded into main memory 108. In operation 515, the program 130 may send a request to the location table 134 for a particular file. In operation 520, the requested file from the various memories may be retrieved. In operation 525, the location table 134 may forward the requested files to the processor 106 for processing.

Referring back to FIG. 1, in various embodiments, the computer system 100 may be a multi-user mainframe computer system, a single-user system, or a server computer or similar device that has little or no direct user interface, but receives requests from other computer systems (clients). In other embodiments, the computer system 100 may be implemented as a desktop computer, portable computer, laptop or notebook computer, tablet computer, pocket computer, telephone, smart phone, or any other appropriate type of electronic device.

The client computer system 102 may include some or all of the hardware and/or computer program elements of the computer system 100. The various program components implementing various embodiments may be implemented in a number of manners, including using various computer applications, routines, components, programs, objects, modules, data structures, etc., and are referred to herein as "computer programs," or simply "programs."

The computer programs include one or more instructions or statements that are resident at various times in various memory and memories in the computer system 100 and that, when read and executed by one or more processors in the computer system 100, or when interpreted by instructions that are executed by one or more processors, cause the computer system 100 to perform the actions necessary to execute steps or elements including the various embodiments. Embodiments may be embodied as a system, method, or computer program product. Accordingly, embodiments may take the form of an entirely hardware embodiment, an entirely program embodiment (including firmware, resident programs, micro-code, etc., which are stored in a memory), or an embodiment combining program and hardware aspects that may all generally be referred to herein as a "circuit," "module," or "system." Further, embodiments may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable memory medium. For example, a computer-readable memory medium may be, but not limited to, an electronic, magnetic, optical, electromagnetic, infrared, or semiconductor system, apparatus, or device, or any suitable combination of the foregoing. More specific examples (an non-exhaustive list) of the computer-readable memory media may include: an electrical connection having one or more wires, a portable computer diskette, a hard disk, a random access memory (RAM), a read-only memory (ROM), an erasable programmable read-only memory (EPROM) or Flash memory, an optical fiber, a portable compact disc read-only memory (CD-ROM), an optical memory, a magnetic memory, or any suitable combination of the foregoing. In the context of this data object, a computer-readable memory medium may be any tangible medium that can contain, or store, a program for use by or in connection with an instruction execution system, apparatus, or device.

A computer-readable signal medium may include a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable memory medium and that communicates, propagates, or transports a program for use by, or in connection with, an instruction execution system, apparatus, or device. Program code embodied on a computer-readable medium may be transmitted using any appropriate medium, including but not limited to, wireless, wire line, optical fiber cable, Radio Frequency, or any suitable combination of the foregoing.

Computer program code for carrying out operations for embodiments may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an selectively attachable portable computer (for example, through the Internet using an Internet Service Provider).

Embodiments are described below with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks.

The computer programs defining the functions of various embodiments may be delivered to a computer system via a variety of tangible computer-readable memory media that may be operatively or communicatively connected (directly or indirectly) to the processor or processors. The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments. In this regard, each block in the flowcharts or block diagrams may represent a module, segment, or portion of code, which includes one or more executable instructions for implementing the specified logical function(s). In some embodiments, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments may also be delivered as part of a service engagement with a client corporation, nonprofit organization, government entity, or internal organizational structure. Aspects of these embodiments may include configuring a computer system to perform, and deploying computing services (e.g., computer-readable code, hardware, and web services) that implement, some or all of the methods described herein. Aspects of these embodiments may also include analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems. In addition, various programs described herein may be identified based upon the application for which they are implemented in a specific embodiment. But, any particular program nomenclature used herein is used merely for convenience, and thus are not limited to use solely in any specific application identified and/or implied by such nomenclature. The exemplary environments illustrated in FIG. 1 are not intended to limit the present embodiments. Indeed, other alternative hardware and/or program environments may be used without departing from the scope of embodiments.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other updates may be made without departing from the scope of the present invention. In the previous description, numerous specific details were set forth to provide a thorough understanding of embodiments. But, embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

What is claimed is:

1. A non-transitory computer readable memory medium having instructions stored thereon which, when executed, cause a processor to perform the following operations:
   calculating a memory space requirement to install files of a program;
   identifying a first set of install files and a second set of install files, wherein the first set of install files includes install files that must be installed for the program to run and the second set of install files includes install files that do not need to be installed in order for the program to run;

determining that a first available memory space in a first memory of a first computer system is smaller than the memory space requirement, wherein the first memory is a default memory for installing the program;

upon determining that the first available memory space in the first memory is smaller than the memory space requirement, prompting a user to connect a second memory with a second available memory space to the first computer system, wherein the second memory is a selectively attachable portable memory, and wherein the second memory is unconnected to the first computer system at the time of prompting;

upon determining that the user connected the second memory in response to the prompting, computing a sum of the first available memory space and the second available memory space;

determining whether the sum is greater than or equal to the memory space requirement to install files of the program; and installing the first set of install files of the program in the first memory and the second set of install files in the second memory when the sum is greater than or equal to the memory space requirement.

2. The computer readable memory medium of claim 1, wherein the instructions when executed further cause the processor to perform the following operation:

generating a location table for the program, the location table containing a file name for each file of the program, a location in the first and second memories where each file of the program is installed, and an indication of whether each file of the program is necessary for the program to execute.

3. A computer system including a processor and a memory encoded with instructions, wherein the instructions when executed on the processor perform the following operations:

calculating a memory space requirement to install files of a program;

determining that a first available memory space in a first memory of a first computer system is smaller than the memory space requirement, wherein the first memory is a default memory for installing the program;

upon determining that the first available memory space in the first memory is smaller than the memory space requirement, prompting a user to connect a second memory with a second available memory space to the first computer system, wherein the second memory is a selectively attachable portable memory, and wherein the second memory is unconnected to the first computer system at the time of prompting;

upon determining that the user connected the second memory in response to the prompting, computing a sum of the first available memory space and the second available memory space;

determining whether the sum is greater than or equal to the memory space requirement to install files of the program;

identifying a first set of install files and a second set of install files, wherein the first set of install files includes install files that must be installed for the program to run and the second set of install files includes install files that do not need to be installed in order for the program to run; and installing the first set of install files in the first memory space and the second set of install files in the second memory space that was connected to the first computer system in response to the prompting when the sum is greater than or equal to the memory space requirement.

4. The computer system of claim 3, wherein the selectively attachable portable memory is a flash drive.

5. The computer system of claim 3, wherein the instructions when executed on the processor further perform the following operation:

generating a location table for the program, the location table containing a file name for each file of the program, a location in the first and second memories where each file of the program is installed, and an indication of whether each file of the program is necessary for the program to execute.

* * * * *